A. SZKOKNYA.
TIRE ARMOR.
APPLICATION FILED OCT. 21, 1915.
1,194,681. Patented Aug. 15, 1916.
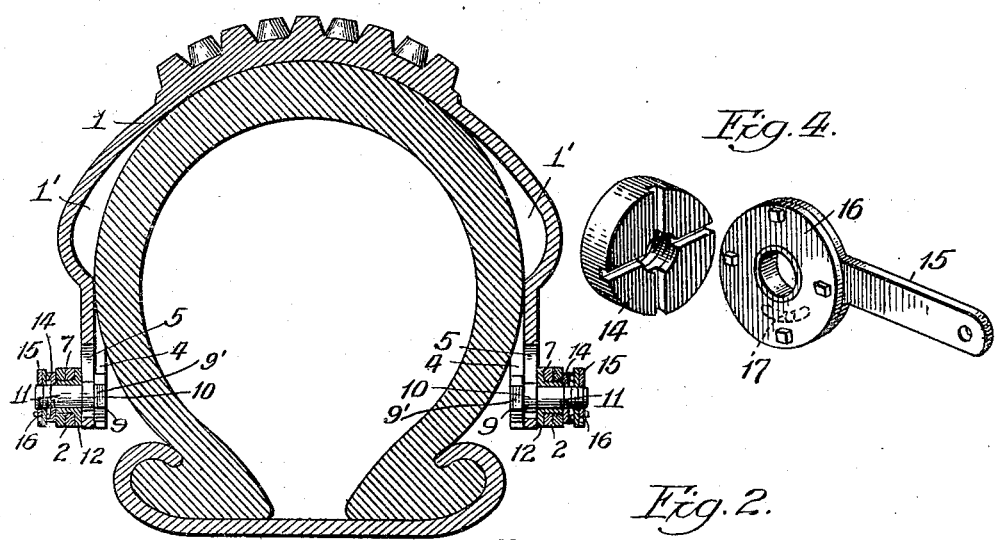
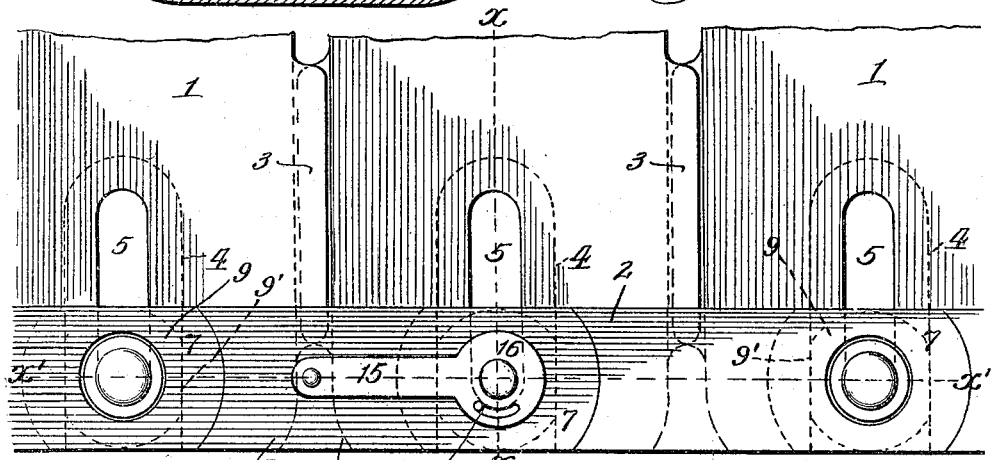
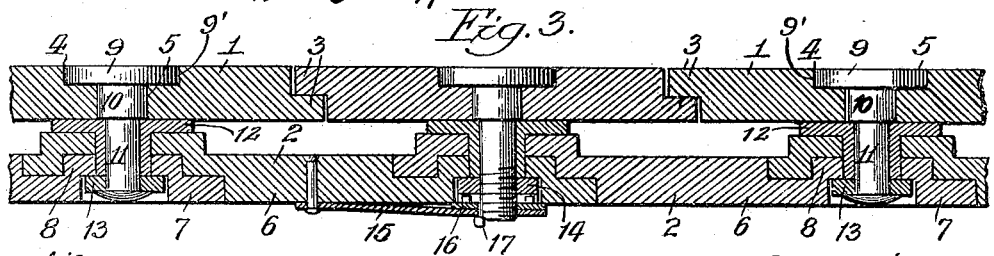

UNITED STATES PATENT OFFICE.

ANDRÁS SZKOKNYA, OF CHICAGO, ILLINOIS.

TIRE-ARMOR.

1,194,681.  Specification of Letters Patent.  Patented Aug. 15, 1916.

Application filed October 21, 1915. Serial No. 57,025.

*To all whom it may concern:*

Be it known that I, ANDRÁS SZKOKNYA, a subject of the Empire of Austria-Hungary, and a resident of Chicago, in the county of Cook, State of Illinois, have invented certain new and useful Improvements in Tire-Armors, of which the following is a specification.

This invention relates to that type of armor for pneumatic tires in which a series of U shaped sections are associated together as a flexible annular member adapted to inclose and protect the tire in actual use. And the present improvement has for its object, to provide a durable and efficient construction of the individual U shaped armor sections whereby the same are held from independent lateral movements with relation to each other, without interference with the free radial movements of the series of sections in actual use.

Another object is to provide a simple and efficient structural formation of the annular holding rings at the respective bases or inner ends of the U shaped armor sections, adapted to afford a strong and durable pivotal connection of the members of said holding rings together, and to the said armor sections, all as will hereinafter more fully appear.

In the accompanying drawings: Figure 1 is a transverse section on line X—X, Fig. 2, illustrating the present armor in place upon a pneumatic tire. Fig. 2, is a detail side elevation of the inner portions of a plurality of armor sections and their connecting accessories, the armor sections and accessories being shown in a straightened condition previous to the application of the armor to a pneumatic tire. Fig. 3, is a detail sections on line X'—X', Fig. 2. Fig. 4, is a detached perspective view of the fastening nut and its locking means.

Similar reference numerals indicate like parts in the several views.

Referring to the drawings, 1 designates individual armor plates or sections, a series of which constitute an annular encircling shield or armor for a pneumatic tire. Said sections are of the usual U shape, with the crown or bearing ridge of each section formed with a roughened tread of any ordinary form and which is either integrally formed, or made separate and attached to said crown or ridge as found most desirable, 1' designates lateral pockets formed in the armor sections 1, at the respective sides of the aforesaid crown or ridge of the armor and mainly outside the planes of the inner parallel side portions of the armor sections. Said pockets are adapted to permit free lateral movement of the side portions of a pneumatic tire as the same is locally distorted in actual use on rough roadways. To such end the bearing surface of such crown of an armor section will have extended transverse dimension, and at each side will merge into the surfaces of the respective pockets which are of the cup or arc shape shown in Fig. 1, with the walls of the lower ends of said pockets extending to and having contact with the side surfaces of the pneumatic tire near the mid-height of the same. By the described structure of the armor sections, the usual lateral or spreading movement of the outer portions of a pneumatic tire in actual use is effectively provided for with a minimum increase in the size and weight of the armor sections.

2 designates a pair of flexible annular rings arranged at opposite sides of the series of armor sections 1, and pivotally connected to the bases or inner ends of said sections.

In the present structure, the inner and approximately parallel side portions of each armor section 1 are provided with offset flanges 3 extending some distance along said side portions and adapted to prevent independent lateral movement between the armor sections when in assembled relation. The described inner portions of the armor sections, with their flanges 3 provide the sole abutting means between said armor sections 1, leaving the outer portions thereof in spaced relation for free independent movement in actual use on rough roadways.

4 designates an elongated recess formed in the inner face of each inner portion of an armor section 1, and adapted to provide a guide for the non-circular head of the hereinafter described fastening bolt or rivet to prevent a turning movement of the same, after the parts have been assembled.

5 designates an elongated slot formed in each inner side portion of an armor section 1, and in central relation to the elongated recess 4 aforesaid. The slot 5 receives an enlarged shank portion of the before mentioned fastening bolt and permits a free and independent movement of its armor section with relation to the next adjacent armor section in actual use.

The flexible rings aforesaid, comprise a series of links 6, each of which is formed with pivot eyes or orifices in its respective end portions 7, and spaced apart to correspond with the distance between the slots 5 of two adjacent armor sections 1. Said pivot eyes are adapted to receive reduced shank portions of the fastening bolts by which pivotal association of the parts is effected. In the construction shown in Figs. 2 and 3, the end portions of each link 6 are reduced in thickness and the said reductions are formed in the outer face of the links at one end, and in the inner face of the links at the other end, in order to provide a counterpart construction of the entire series of links, and so that when in assembled relation the series of links will have an approximately flat front or outer face.

8 designates a bearing neck or boss formed on one of the ends of the series of links 6, in concentric relation to the eye portions thereof and adapted for bearing engagement in recesses in the other or opposite ends of the series or links 6, as shown. Said bearing necks 8 and receiving recesses are adapted to assume the tensioned strain on the parts in actual use and relieve in a material degree the strain imposed on the bolts or rivets usually employed to pivotally connect said links together.

The fastening bolts or rivets above referred to comprise a detail formation as follows:

9 designates a non-circular head adapted to have limited movement in an elongated recess 4 of an armor section 1 aforesaid, and preferably formed with curved upper and lower portions and flat side portions 9' as shown.

10 designates an enlarged shank portion next adjacent to the head 9 aforesaid and adapted to have limited movement in an elongated slot 5 of said armor section 1.

11 designates a reduced outer shank portion adapted to receive a flanged sleeve 12, which in turn is adapted to have bearing in the pivot orifices in the ends of two adjacent links, as shown.

13 designates a washer fitting a recess formed in the outer surface of a link 6 aforesaid, in concentric relation to the pivot orifices thereof. The washer 13 is adapted to fit the outer part of the reduced shank 11 aforesaid, so that the extreme outer end of said shank 11, may be riveted or upset against said washer to effect a permanent attachment. It is within the scope of this part of the present invention to substitute for the above described riveted fastening means, a nut 14 screwing upon a screw thread formed on the outer end of the aforesaid reduced shank 11, where a ready detachment of the parts is desired in applying the armor to a tire and in a subsequent removal of said armor.

15 designates a spring finger pivotally attached to the face of a link 6, with its free end adapted to overlap the outer end of the nut 14, aforesaid. Said free end is provided with a series of projections adapted to engage in corresponding recesses, in the outer face of nut 14, to prevent accidental unscrewing of said nut in actual use. In the preferred construction, of the spring finger 15, shown in the drawing, the nut engaging portions aforesaid will comprise a separate disk 16, journaled on the free end of finger 15, and adapted to have limited independent turning movement thereon by means of a pin and segmental slot 17 as shown, so that said disk may be turned to register and engage its projections in the corresponding recesses of the nut 14, aforesaid.

Having thus fully described my said invention what I claim as new and desire to secure by Letters Patent, is:

1. A tire armor comprising, a series of U shape sections having inner and approximately parallel side portions and formed with outer laterally curved bearing surfaces engaging the crown of the tire and with lateral pockets of an arc shape intermediate said bearing and parallel side portions and disposed mainly outside said parallel side portions, and means for movably connecting said side portions together, substantially as set forth.

2. A tire armor comprising, a series of U shape sections having inner and approximately parallel side portions provided with elongated slots and with overlapping side flanges for guiding engagement of said side portions, the portions of said sections outward of said flanges having separated relation, an annular series of links, and pivot bolts connecting said links together and having guiding engagement in the elongated slots of the armor sections substantially as set forth.

3. A tire armor comprising, a series of U shape sections having inner and approximately parallel side portions formed with elongated recesses and companion elongated slots, a pair of flexible rings connecting said side portions together and comprising a series of links, and a series of pivot bolts passing through said links and having radial movement in the elongated recesses and slots aforesaid, substantially as set forth.

4. A tire armor comprising, a series of U shape sections having inner and approximately parallel side portions formed with elongated recesses and companion elongated slots, a pair of flexible rings connecting said side portions together and comprising a series of links, a series of pivot bolts passing through said links and having radial movement in the elongated recesses and slots aforesaid, and flanged bearing collars on the shanks of the pivot bolts providing bearings for the links aforesaid, substantially as set forth.

5. A tire armor comprising a series of U shape sections having inner and approximately parallel side portions formed with elongated recesses and companion elongated slots, a pair of flexible rings connecting said side portions together and formed by a series of links, and a series of pivot bolts passing through said rings and having radial movement in the elongated slots aforesaid, said bolts having non-circular heads moving in the elongated recesses aforesaid and held thereby from a turning movement, substantially as set forth.

6. A tire armor comprising, a series of U shape sections having inner and approximately parallel side portions formed with elongated recesses and companion elongated slots, a pair of flexible rings connecting said side portions together and formed by a series of links, a series of pivot bolts passing through said rings and having radial movement in the elongated slots aforesaid, said bolts having non-circular heads moving in the elongated recesses aforesaid and held thereby from a turning movement, and flanged bearing collars on the shanks of the pivot bolts providing bearings for the links comprising the flexible rings, substantially as set forth.

Signed at Chicago, Illinois, this 16th day of October, 1915.

ANDRÁS SZKOKNYA.

Copies of this patent may be obtained for five cents each, by addressing the "Commissioner of Patents, Washington, D. C."